ure Patent [19]
Ellis et al.

[11] 3,920,320
[45] Nov. 18, 1975

[54] PROJECTOR FOR FRONT PROJECTION PHOTOGRAPHY

[75] Inventors: Donovan K. Ellis; William P. Ryan, both of Northbrook, Ill.

[73] Assignee: Lumi-Tek, Inc., Glenview, Ill.

[22] Filed: Apr. 19, 1974

[21] Appl. No.: 462,324

[52] U.S. Cl. .................................... 352/89; 355/70
[51] Int. Cl.² ............................................ A63J 5/09
[58] Field of Search ............ 352/89, 47; 355/70, 71

[56] References Cited
UNITED STATES PATENTS

| | | | |
|---|---|---|---|
| 2,530,843 | 11/1950 | Smith | 355/70 |
| 3,143,921 | 8/1964 | Russell | 355/71 |
| 3,350,980 | 11/1967 | Margolin | 352/89 |
| 3,573,456 | 4/1971 | Beeh | 355/71 |
| 3,598,471 | 8/1971 | Baldwin | 355/71 |
| 3,610,120 | 10/1971 | Morse | 352/89 |
| 3,634,004 | 1/1972 | Howard | 352/89 |

*Primary Examiner*—John M. Horan
*Attorney, Agent, or Firm*—Hill, Gross, Simpson, Van Santen, Steadman, Chiara & Simpson

[57] ABSTRACT

A projector includes a transparency holder for accurately aligning and positively positioning a transparency in front of a source of diffused light which transmits light of even intensity through all portions of the transparency. The light source includes a strobe lamp and a modeling lamp mounted within a broad beam reflector, and a light diffuser positioned between the lamps and the transparency holder. The light diffuser includes a dichroic filter for isolating the transparency from heat generated by the lamps, a mirrored light passageway and a ground glass covering the outlet end of the passageway. The light which permeates the transparency is reflected upwardly by an adjustably mounted mirror to a second mirror which directs the light toward a projection screen. A lens with a diaphragm is included in the light path between the two mirrors to adjust the amount of light projected toward the projection screen. The second-mentioned mirror is mounted on the exterior of the projector and is constituted by a beam splitting mirror which is permeated by light received in the reverse direction from the screen and from a subject positioned in front of the screen. A camera mount is provided behind the beam splitting mirror for photographing the composite scene in accordance with the reflected light which permeates the beam splitting mirror. The camera mount and the beam splitting mirror are mounted on a removable plate for replacement by a similar plate-mirror-mount structure adapted to receive a different camera. The camera mount is adjustable to predetermined positions along the length of the projector so that lenses of different focal length may be utilized by a camera attached to the camera mount.

9 Claims, 10 Drawing Figures

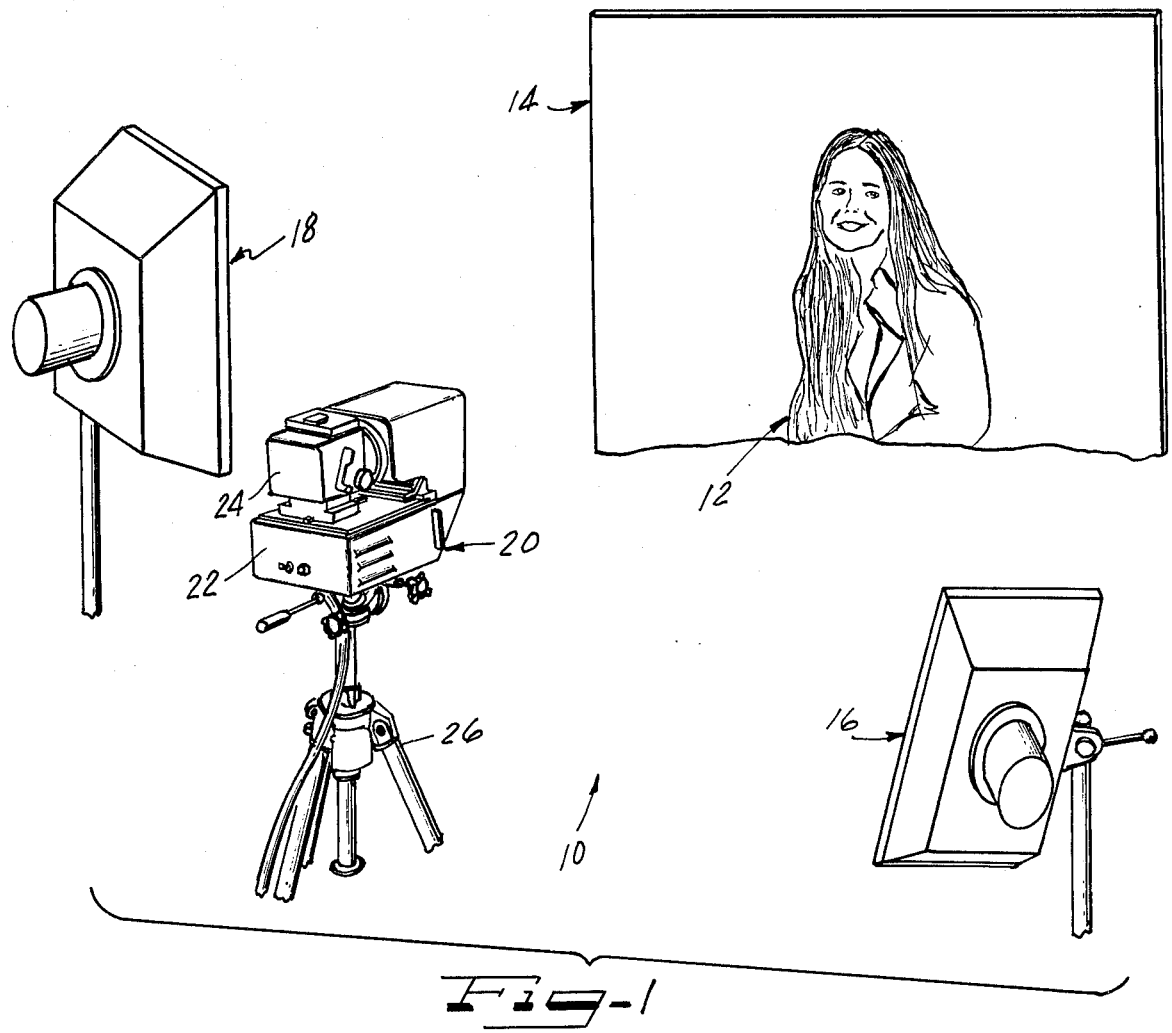
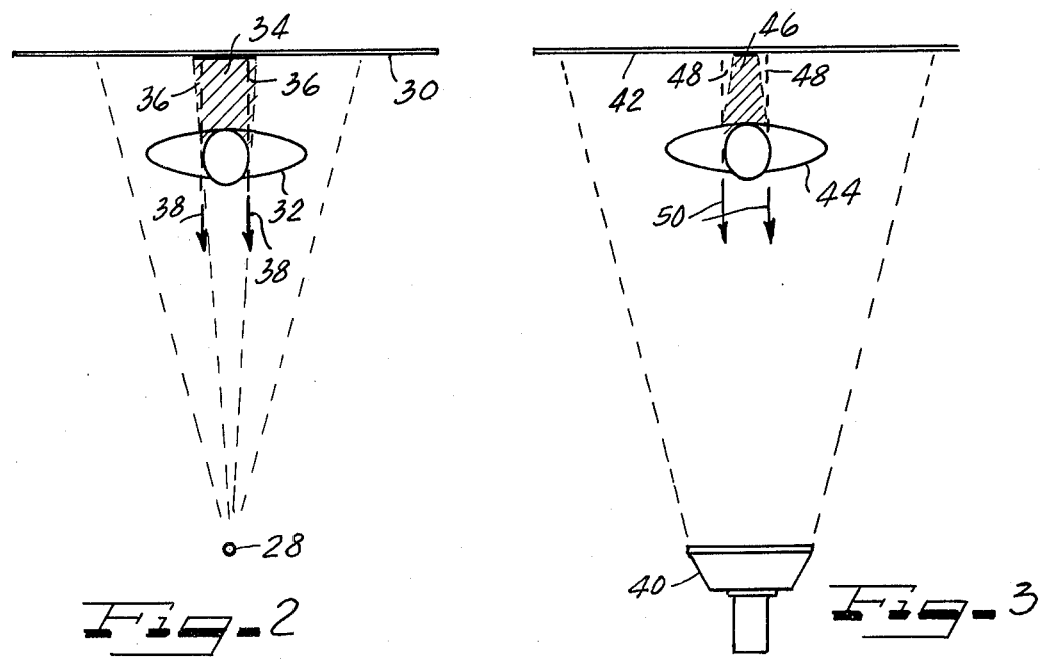

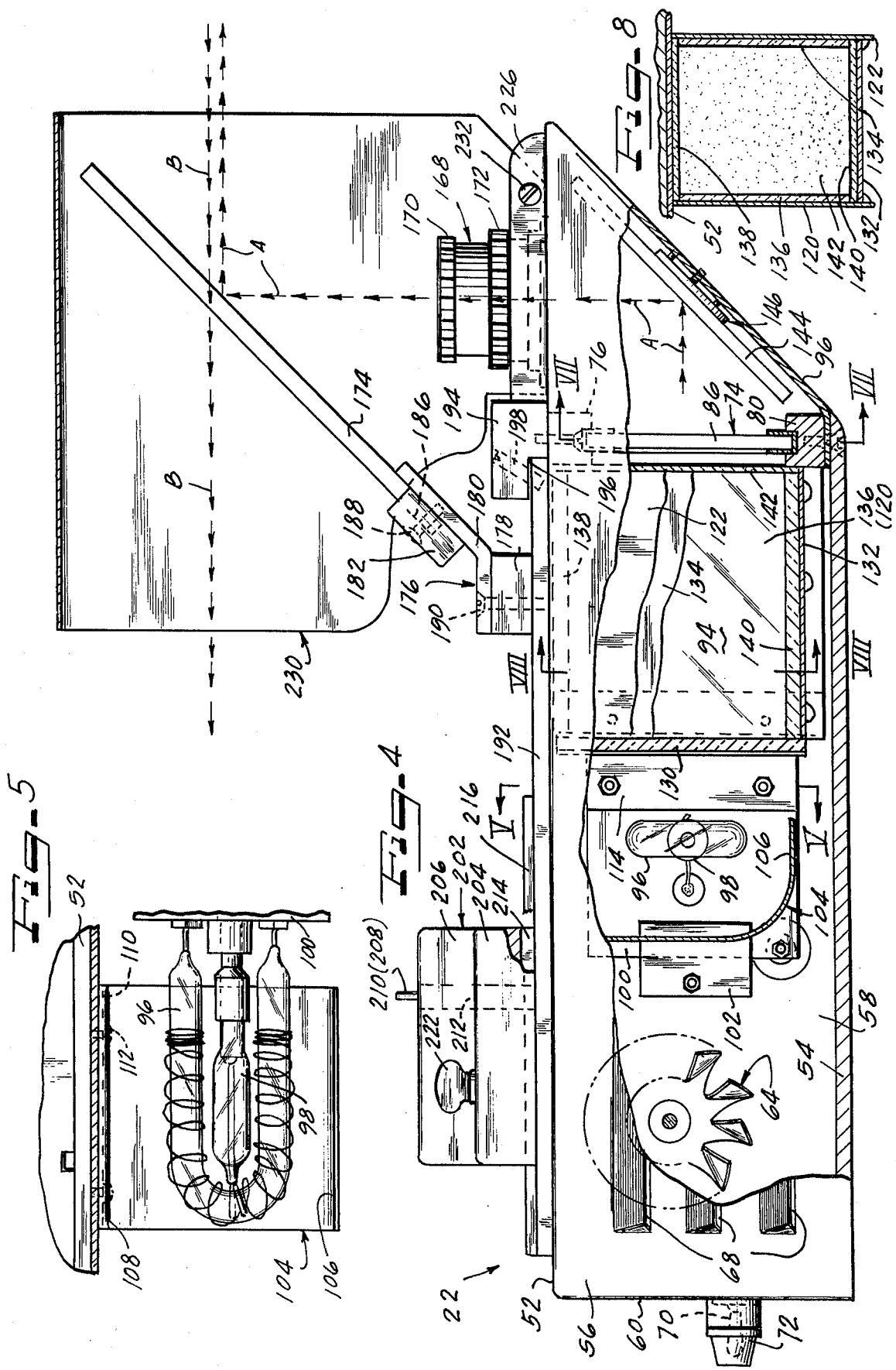

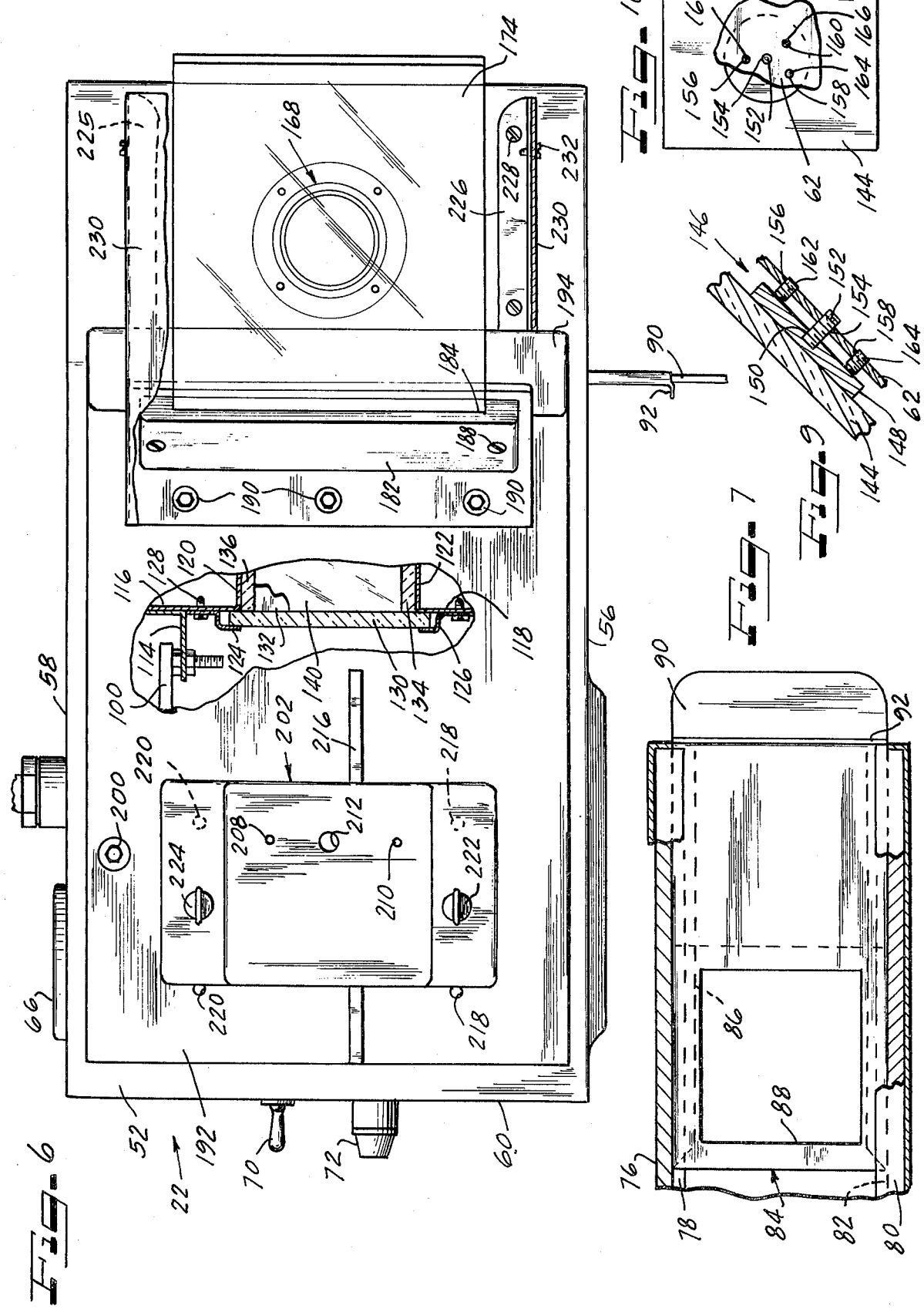

PROJECTOR FOR FRONT PROJECTION PHOTOGRAPHY

BACKGROUND OF THE INVENTION

1. Field of the Invention

This invention relates to photographic apparatus, and more particularly to portable photographic apparatus for taking "on location" environmental portraits using front screen projection techniques.

2. Description of the Prior Art

In the context used herein, the term "on location" refers to photography at locations other than a photographers studio and may include such locations as schools, churches, shopping centers, kiosks, or the like where there may not be permanent portrait studio facilities.

The basic principle of front projection is, in general, well known in the art. Front projection, however, has not been used to any great extent for "on location" portrait photography due to the size, weight and technical complexity of the projection units heretofore available in the art and due to the fact that directional lighting which would produce acceptable results was not available. Examples of apparatus utilized in environmental portrait photography by a front projection techniques may be had by referring to U.S. Pat. No. 3,350,980 issued to George D. Margolin and U.S. Pat. No. 3,227,509 issued to Hobart Baker. Other techniques of interest in this general art area also may be had by referring to U.S. Pat. Nos. 2,727,427 and 2,727,429, both issued to Will F. Jenkins.

In taking reference to the prior art, including that set forth above, one skilled in the art immediately recognizes several disadvantages in prior projection systems. These disadvantages include: heavy, bulky equipment; complex alignment and focusing procedures; and of primary interest, nominal results in the finsihed product due to a "black line" effect caused by the low intensity reflection of the shadow of a subject back toward the camera about the edges of the subject.

A photographer could, of course, take a subject to a park, or other city area, search for an appropriate background against which to pose his subject, and then take an environmental portrait. Outside of being somewhat time consuming, many problems may arise in using this technique. For example, changes in environmental conditions, such as changing sunlight conditions, are undesirable and may require additional time expenditures. When humidity, rain, snow and other elements in nature are sometimes highly unpredictable and cause additional problems. All of these problems are compounded when a photographer is to take a large number of individual portraits, as for school classes and the like. Therefore, "on location" environmental photography utilizing projected backgrounds is highly desirable. HOwever, for the reasons mentioned above, great difficulties are encountered in transporting, setting up and aligning the projection and photographic apparatus, and the finished portrait is not totally adequate.

SUMMARY OF THE INVENTION

In view of the foregoing, it is the primary object of the invention to provide new and improved portable apparatus for "on location" environmental photography.

Another object of the invention is to provide new and improved apparatus for eliminating the "black line" effect in projecting a background scene on a projection screen with a subject positioned in front of the screen in an interference relationship with respect to the projected and reflected light.

Another object of the invention is to provide projection apparatus in which all portions of a transparency of the background is permeated by the same light intensity.

Still another object of the invention is to provide projection apparatus which includes a camera mount directly on the housing of the projector.

Yet another object of the invention is to provide a projector-camera mount structure which requires no adjustment by the photographer, with the attendant object that the camera mount be replaceable in accurate alignment with the projector to adapt the structure to different cameras, and with the further attendant object that each camera mount be adjustable at predetermined settings to accommodate lenses of different focal length which are available for each specific camera.

These and other objects of the invention are achieved through the provision of a projector housing having top, bottom, side, and forward and rear end walls, within which a transparency may be supported. The transparency is supported in a slide mounted within guide rails and including a stop for accurately aligning a transparency with respect to a light source.

Prior frontal projection systems, such as Margolin, required a condenser light source and a point light source type illumination using a special flash tube on the basis that such was required to reduce black line effect in front projection photography. The present invention does not utilize this type of illumination.

The light source, in contrast to sources employed in prior projectors, is not a point light source, but a source of broad beam light which permeates all portions of the transparency with equal light intensity. Condensing lenses or optical lenses are not used in the illumination system of the present invention as in other projectors or systems. The light source of the illumination system of the present invention is constituted by either or both of a strobe lamp and a modeling lamp mounted within the housing and in front of a squared U-shaped broad beam reflector, and a light diffuser which includes a light passageway of mirrored surfaces and a ground glass covering the outlet of the light passageway. The diffuser receives the broad beam from the aforementioned light generating and reflecting structure. The transparency is positioned in front of the diffuser at a distance at which the light is collimated sufficiently to permeate all portions of the transparency with equal intensity.

It should be noted that prior devices depend upon the utilization of condensing lenses or optics to "collimate" light as a requirement to reduce the penumbra shadow cast behind the subject onto the screen. This vague and indistinct shadow causes, to a great extent, the black line effect mentioned above in front screen projection photography. The present invention utilizes an electronic flash system and illumination system of sufficient intensity to permit small diaphragm $f$ stops on the lens of the projector. Accordingly, the light emanating from the projector renders the projector, as a light source, a source which more closely approaches that of a point light source and the aforementioned black line shadow effects are reduced to an acceptable level without having to resort to condensing lenses heretofore utilized as being necessary in such systems.

A dichroic filter is positioned at the inlet of the light passageway to reflect the electromagnetic radiation at and near the infrared portion of the spectrum and thereby keep the forward portion of the projector cool so as to protect the transparency. The rear portion of the projector is provided with a cooling fan for removing heat from the projector housing.

The forward wall of the projector is disposed at an upwardly extending angle of approximately 45° and adjustably mounts a mirror for reflecting the background projection upwardly through a diaphragm in the top wall of the projector. The mirror is mounted on a gimbel, provided for factory adjustment, and it should not be necessary to readjust the mirror, unless the projector becomes damaged wherein the mirror would be jolted out of alignment.

The light regulation is contained in the form of a projection lens with an internal diaphragm which may include a focusing adjustment for fine control of the lens and a regulatable opening adjustment for light control. In a particular construction, the projection lens was a Componar 1:4.5/105 $f$ 4.5–$f$ 22 lens manufactured by Schneider-Krueznach.

A second mirror is mounted on the exterior of the projector at approximately 45° to receive the light passing through the diaphragm and reflect the same in the forward direction toward a projection screen. This mirror is of a type generally referred to as a beam splitting mirror and is permeable to light in the reverse direction toward the projector. Advantageously than, a camera may be positioned behind this mirror to photograph the composite scene of the background and a subject positioned in front of the background. For this purpose, a camera mount is incorporated with and carried on the projector. The camera mount and the beam splitting mirror are mounted on a removable plate so that a similar plate adapted to mount a different camera may be substituted without the necessity of alignment procedures. In addition, each camera mount is adjustable longitudinally of the projector to predetermined locations so that any available focal length lens for a specific camera may be utilized through the provision of these predetermined settings, rather than requiring complex adjustments.

BRIEF DESCRIPTION OF THE DRAWINGS

Other objects, features and advantages of the invention, its organization, construction and operation will be best understood from the following detailed description of a preferred embodiment of the invention, taken in conjunction with the accompanying drawings, on which:

FIG. 1 is a pictorial representation of an "on location" environmental portrait photographic system utilizing the projector apparatus of the present invention;

FIG. 2 is a diagrammatic sketch of front projections utilizing a point light souce as was heretofore known in the prior art;

FIG. 3 is a diagrammatic sketch of front projections utilizing broad beam projection using intense light at small projection apertures according to the present invention;

FIG. 4 is an elevational view, shown partially broken away, of projection apparatus constructed in accordance with the principles of the present invention;

FIG. 5 is a sectional view taken generally along the lines V—V of FIG. 4 showing a strobe lamp, a modeling lamp and a broad beam reflector;

FIG. 6 is a top plan view of the apparatus of FIG. 4, shown partially broken away;

FIG. 7 is a sectional view taken generally along the line VII—VII of FIG. 4 showing the transparency holding and aligning apparatus;

FIG. 8 is a sectional view taken generally along the line VIII—VIII of FIG. 4 showing the mirrored light passageway and ground glass of the diffuser;

FIG. 9 is a fragmentary sectional view of the gimbel mount for the mirror carried on the forward wall of the projector illustrated in FIG. 4; and FIG. 10 is a plan view of the mirror and gimbel mount illustrated in section in FIG. 9.

DESCRIPTION OF THE PREFERRED EMBODIMENT

Referring to FIG. 1, an "on location" environmental front projection photographic system for portrait photography is illustrated at 10 wherein a subject 12 is positioned in front of a projection screen 14 and illuminated by light units 16 and 18 to remove shadows as may occur around the eyes, nose, or other portions of the subject. The light units 16 and 18 may each advantageously include a modeling lamp and a strobe lamp, each of which are well known in the art. Each of the light units 16 and 18 may also advantageously include means for directing the light produced by such lamps.

The system further includes projection and photographic apparatus 20 including a projector 22, a camera 24 mounted directly on the projector 22 and a tripod 26 for supporting the projector and camera.

The projector 22 includes means for projecting the background scene on the screen 14 as a broad beam of focused light of equal intensity at all portions of the scene. The difference between this type of projection and that heretofore known in the prior art is illustrated in FIGS. 2 and 3. In FIG. 2, for example, prior projection apparatus has employed a special flash tube which approximates a point light source 28 and a condenser-lens system to project a scene toward a projection screen 30. With a subject 32 positioned in front of the screen (here considering the head only of the subject), a shadow area is formed on the screen 30 behind the subject 32. At the fringe areas 36 of the shadow 34, light of low intensity is reflected directly back from the screen so that the subject has a dark outline, which has become known in the art as the "black line" effect, and is indicated by the arrows 38. This effect is noted when the shadow of the subject extends out further than the area masked off by the subject, and is most pronounced as the diffusion illumination source begins to differ from a point light source. Accordingly, in prior devices these condensing lens systems were utilized to produce light of a quality that would cast a maximum intensity shadow with a minimum amount of a fringe shadow effect.

By way of contrast, however, the principles of diffused beam projection, according to the present invention, is illustrated in FIG. 3 wherein a broad beam of diffused light is projected from a source 40 onto a screen 42 such that the transparency is illuminated with even diffused light of great intensity from the broad beam light source, e.g. an electronic flash tube. This light is projected through a projection lens working at relatively small apertures of $f$ 11 to $f$ 22 and smaller. These small lens apertures overcome the problem made evident in the prior art of preventing the shadow or the diffused shadow effect from showing in the resulting pictures. The illumination system of the present invention presents light of sufficient intensity and of even illumination so that the black line effect is reduced to an acceptable level. This projection causes a reduced shadow area 46 on the screen due to the subject 44 positioned in front of the screen and masking the shadow cast by the subject so that areas 48, which correspond to the areas 36 in FIG. 2, receive and reflect light of much higher intensity than the counterpart areas in FIG. 2, as indicated by the arrows 50.

In the front projection system illustrated in FIG. 1, it is of advantage to utilize a projection screen of the directional type which reflects the light received directly back toward the original light source. Therefore, light striking the screen from the light units 16 and 18 does not wash out the projected background scene, and the background scene is reflected directly back toward the projector along with the light reflected toward the projector by the subject. By the same token, the subject does not reflect the background projected thereon by the broad beam diffused light system, even when the subject is wearing white clothing, such as a white wedding gown.

Turning now to the specific structure of a preferred embodiment of the invention, and referring initially to FIGS. 4, 6 and 7, a projector is generally illustrated at 22 as comprising a top wall 52, a bottom wall 54, a pair of sidewalls 56 and 58, a rear end wall 60 and a forward end wall 62 which generally define the housing of the projector. A fan 64 is mounted within the rear portion of the housing to draw ambient air through an opening 66, which includes a filter (not shown), and exhaust heated air through louver type openings 68 in the sidewall 56..

An on/off switch 70 and a fuse holder 72 are mounted on the rear wall 60 for controlling the operation of the blower and protecting the electrical circuit, as is well known in the art. Inasmuch as circuits for controlling and powering modeling lamps, strobe lamps and fans are well known in the art, the specific circuit of the projector and the interconnections and wiring of the elements have been omitted from this application in the interest of simplification and clarity.

Referring specifically to FIGS. 4, 6 and 7, a transparency, conventionally a 2¼ × 2¼ slide, is supported by a slide holder 74 near the forward end of the projector. The slide holder 74 comprises an upper transverse member 76 having an elongate slot 78 and a lower transverse member 80 having a slot 82 which function as guides for a transparency holder 84 which includes a transparency holding slot 86 and an aperture 88 at one end thereof and a handle 90 at the other end thereof. Adjacent the handle 90 is a vertically oriented rearwardly extending projection 92 which serves as a stop against the sidewall 56 to accurately position the transparency within the housing in front of the broad beam light source generally indicated at 94.

The illumination light which permeates the holder 84 and the transparency through the aperture 88 is illustrated in FIGS. 4, 5, 6 and 8.

Referring first to FIGS. 4 and 5, a U-shaped strobe lamp 96 and a modeling lamp 98 are provided for photographing and viewing a composite scene before photographing, respectively, and constitute the light generating means of the projector. For example, excellent results have been obtained using a 250 watt quartz lamp for the modeling lamp 98, and, at $f$ 16, a 400 watt-/second flashlamp is adequate for a 6 feet × 7 feet screen and 2400-2600 watt/second flashlamps provide the desired results for a 15 feet × 20 feet screen.

The flash or strobe lamp 96 and the modeling lamp 98 are mounted on a circuit board 100 which carries the circuit interconnections (not shown) for operating the projector. The circuit board 100 has a plate structure 102 connected thereto to guide and support the interconnecting wires of the projector. The circuit board 100 is supported spaced from the sidewall 58 on a mounting bracket 114 as will be discussed below.

The light generated by the lamps 96 and 98 is reflected by a broad beam reflector 104 constructed in the shape of a squared U structure (FIGS. 4 and 5) having a lower forwardly extending leg 106, an upper forwardly extending leg 108, and a rearwardly extending upper member 110 which is secured to the top wall 52 by suitable means, such as screws 112, so that the reflector 104 depends from the top wall 52 with its legs 106 and 108 extending about the lamps 96 and 98. The particular shape illustrated in the drawings is employed in that the same is easier to manufacture than a similar structure with square, rather than arcuate, corners, although the squared shape may be preferred to reflect a more even concentration of light across the entire beam. A change of the shape of the reflector may be employed to change the amount of light permeating different portions of a transparency; however, an even light intensity across the transparency is generally preferred.

Referring to FIGS. 4 and 6, it can be seen that a heat shielding structure generally divides the projector into two compartments wherein the forward compartment housing the transparency is generally isolated and heat insulated from the rear compartment which contains the lamps 96 and 98. This heat shielding structure comprises a pair of transverse plate portions 116 and 118 having forwardly extending portions 120 and 122 which form a part of a light passageway as will be discussed hereinbelow. A pair of S-shaped vertically extending brackets 124 and 126 are secured to the plate portions 116 and 118, respectively, by suitable means such as screws 128 and clamps a dichroic filter 130 in front of the lamps 96 and 98 to reflect electromagnetic radiation in and near the infrared portion of the light spectrum. The plate portions 116 and 118 and the dichroic filter 130 therefore provide isolation and insulation between the forward and rear compartments of the projector. In FIG. 6 it will be noted that the bracket 114 which supports the circuit board 100 is secured to the plate portion 116, as by welding or other suitable means not shown in the drawing.

The light transmitted through the dichroic filter 130 enters a light passageway (FIGS. 4, 6 and 8) having an outer structure formed by the plate portions 120 and 122, the top wall 52, and a plate 132. The inside surfaces of the passageway are, or carry, mirrors 134–140 which reflect and "break up" the light waves and present the same to a ground glass 142 which covers the end of the light passageway. The ground glass 142 evens out and further completes the diffusion of the light.

The intense illumination light which permeates the transparency follows a path indicated by the broken arrows A for projection toward the projection screen. As seen in FIGS. 4, 9 and 10, the light is reflected upwardly by a planar mirror 144 which is adjustably mounted by a gimbel mount 146 to the forward wall 62 of the projector. In a particular construction of a projector according to the present invention, the mirror 144 has a brass disc 148 bonded thereto, as by gluing or the like, which disc 148 includes a threaded bore 150 for threadedly receiving a screw 152 which extends through a threaded aperture 154 in the forward wall 62. The screw 152 serves as a pivot point for the mirror. A plurality, here three, threaded apertures 156, 158 and 160 receive respective threaded screws 162, 164 and 166 which abut the disc 148 and together accurately align the mirror. This is intended to be a factory adjustment and further adjustments should not be necessary unless the mirror 144 is somehow displaced, as may occur if the projector is jolted, dropped or the like.

The light reflected from the mirror 144 traverses the path A upwardly through a diaphragm in the form of a projection lens which may include an aperture adjusting ring 170, and a focusing ring 172 which may sometimes be used to advantage in particular situations. It is intended, however, that all adjustments in using the projector and an associated camera will be performed at the camera through changes of f-stops and camera lens focusing.

The light traversing the path A in the upward direction strikes a surface of a mirror 174 which, as illustrated in the drawing, is positioned at an angle of 45° with respect to the direction of the incident light so as to reflect the light at a right angle and in the forward direction toward a projection screen.

The mirror 174 is mounted on top of the projector (FIGS. 4 and 6) in a mounting structure 176 which includes a block 178, an angular element 180 supported on the block 178, a member 182 having a recessed portion 184 which, together with a surface of the angular member 180, forms a slot for receiving an end portion of the mirror 174. The member 182 is secured to the angular member 180 by suitable means, such as by screws 188, and the entire mirror mounting structure 176 is secured to a plate 192 by suitable means, such as by the screws 190.

The plate 192 is an interchangeable plate, as will be understood from the discussion below, and is supported on the top wall 52 of the projector. At the forward end thereof, the plate 192 fits in an undercut recessed portion 196 of a transversely extending bracket 194 carried on and secured to the top wall 52. A plurality of screws 198 (only one shown) extends through the member 194 and into the removable plate 192 to secure the forward end thereof. As seen in FIG. 6, additional attachment of the plate 192 to the top wall 52 may be had through the provision of additional screws, such as a screw 200.

The light reflected from the projection screen toward the projector, and the light reflected from a subject positioned in front of the projection screen, from a composite scene for the environmental portrait and are received in the reverse direction of the light path A, as indicated by the shorter broken arrow path B. The mirror 174 is of a type generally known as a beam splitting mirror and is permeable to light passing in the direction B. Therefore, a camera for photographing the composite scene may be mounted behind the mirror 74.

Advantageously, the camera may be mounted on the removable plate 192 by way of a camera mount 202.

The camera mount 202 comprises a block 204 having an upper portion 206 for supporting a camera. As indicated in FIGS. 4 and 6, the upper portion 206 may include upwardly projecting pins, such as pins 208 and 210, and downwardly extending bores, such as the bore 212, which may be employed in mounting a specific type of camera. Other pin, bore, threaded and other type combinations of couplings between the upper portion 206 and a camera may be provided, as desired.

For any specific camera, a variety of lenses of different focal length are usually available and used by photographers for different effects. Therefore, the block 204 is movable to different predetermined locations for these particular focal lengths so that complex adjustments are not required bewteen a camera adapted for mounting at elements 208–212 and the mirror 174. One advantageous structure for providing these predetermined positions of the camera include, as illustrated in FIGS. 4 and 6, a longitudinal slot 214 in the bottom of the block 204 which slidably receives a longitudinally extending rail 216. A first plurality of threaded bores 218 are provided in longitudinal alignment in the removable plate 192, and a second similar plurality of threaded bores 220 are provided in the removable plate 192 for selectively receiving respective locating screws 222 and 224.

The plate 192 carrying the mirror 174 and the camera mount 202 may be replaced by a similar structure in which the camera mount 202 is adapted for a different camera, again to obviate the necessity for complex alignment and adjustment procedures.

At the forward end of the projector a pair of L-shaped brackets 225 and 226 are secured to the top wall 52 by suitable means, such as screws 228 to mount a detachable hood 230, by suitable means, such as screws 232, to cover and protect the beam splitting mirror 174 from accidental abuse and to shield the mirror from extraneous light.

The interior of the housing and the inner surface of the hood are coated with a light absorbing surface to prevent unwanted reflections.

The camera mount 202 may be provided for any type of camera. Standard camera mounting system have been provided for such apparatus as the Beattie Coleman Systems Portronic model cameras, the Nord Engineering Corporation camera, the Photo Control Corporation model cameras, the Beattie Engineering Corporation Universal model camera, the Hasselblad 500 EL model cameras, the Mamiya RB 67 model cameras and several other less professional cameras. The flexibility in mounting different cameras through interchange of the plate 192 and the flexibility in utilizing specific positions for particular focal length lenses for a specific camera, is accomplished without the necessity of complex adjustments.

In summary, the present invention relates to portable photographic apparatus for taking "on location" environmental portraits utilizing the techniques of front screen projection. Because of the lightweight and ease of handling of the equipment, "on location" may be at any location and the apparatus may be used to great advantage in particular in high volume photographic portrait applications.

The invention obviates the necessity of using rolled color paper, hand painted backgrounds and other artificial props.

Because of the lightweight and simplicity of the apparatus, it may be easily transported by those would not ordinarily employ "on location" front projection apparatus due to size, weight and technical complexity of projection apparatus heretofore known in the art.

Because of the excellent results in eliminating the "black line" effect, and because of the simplicity of the apparatus, excellent results may be obtained by those of lesser photographic skill, although the apparatus is, of course, highly advantageous for the professional photographer.

The overall system is quite simple in that the photographer merely attaches his camera to the projector, aims the projector and camera toward the background screen, poses his subject between the camera and the background screen, and focuses the camera on the subject as he normally would. At his option, the photographer may turn on the modeling lamp to view the total composite picture of the subject and the environmental background to ensure that oddities, such as the appearance of a limb projecting from a subject's ear, are not encountered. The photographer then simply takes the picture, at which time the synchronized flash portions of the system become operative, as is well known in the art.

Broad beam front projection, utilizing light diffusion and collimation, as set forth hereinabove, provides many advantages other than those listed above, including the elimination of movable mirrors and movable optical systems which require the photographer to align the camera and the projector each time it is used. The invention also utilizes a system of factory preadjustment thereby permitting cameras to be mounted on the device quickly and easily with automatic alignment of the camera. Also, identical models of the same camera may be provided with identical mounts 202 and interchanged with replacement of the removable plate 192 to permit a photographer to continue to operate, while, for example, an assistant takes care of the dismounted camera, as in reloading or the like.

The front projection system described herein provides an additional feature which is of advantage to those who wish to engage in silhouette photography. Inasmuch as only the projection screen, and not the subject, will reflect the projected background scene, with a pure white transparency projected onto the screen and the subject not illuminated from the front, as by the light units 16 and 18, a sharp composite silhouette may be photographed.

In prior art such as U.S. Pat. No. 3,350,980 referred to above which uses means using condensing lenses to illuminate the transparency, when the operator regulates the light output using a diaphragm on the projector lens, this tends to cause a shift in focus of these condensing lenses, and unless these condensing lenses are absolutely perfect, it results in color fringing and ringing. In other words, uneven lighting on the screen results with resulting colors that are unwanted. Secondly, these condensing lenses are focused and have a focus that is valid for only one distance. If the operator is focusing these condensing lenses to give even illumination at 10 feet away, and the subject moves into five feet, the illumination will not be even from those condensing lenses, unless they are refocused, which means respacing them.

With a diffusion light source in accordance with the present invention the operator has the option of regulating the light intensity. The condensing system which is in the prior art such as U.S. Pat. No. 3,350,980 is only valid for a given distance. For example, if the projector is 15 feet from the subject, the condensing lenses are then set to give even illumination at a 15 foot distance, but if the operator works at any other distance or regulates the diaphragm up and down to regulate the amount of light coming out, the condensing lenses shift focus, and unless they are absolutely perfect, color fringing and uneven illumination results. This is a phenomena widely known in photographic enlargers. In other words, in any projection system using point light sources in condensing lenses, it is only valid for one distance, a given distance. If you want to change that distance, then you have to change the distance between the condensers, you have to focus the condensers. So, in using a diffusion system such as disclosed herein, the photographer can regulate the light output at any working distance without fear of obtaining uneven illumination on the screen, or what is known as color fringing, which is a defect in the condenser. In other words, once the lens is stopped down, multi-colored patterns begin to appear on the screen due to minor aberrations in the condenser system. For this reason, photographers in color printing, in the field of color enlarging, have more or less abandoned straight point light source systems and have gone to other systems. In other words, point light systems were considered essential to the art of front screen projection. Today the professional photographers no longer use these systems totally becauses they have discovered these problems, the inability to attenuate the light satisfactorily, the inability to work at differing distances and the size and complexity of these devices created the need for the development of a lightweight diffusion system as opposed to a point light source system using condensing lenses.

Many changes and modifications of the invention may become apparent to those skilled in the art without departing from the spirit and scope of the invention. We therefore intend to include within the patent warranted hereon all such changes and modifications as may reasonably and properly be included within the scope of out contribution to the art.

We claim:

1. A projector for projecting an image onto a screen, comprising:

a housing;

a holder mounted in said housing for holding a transparency bearing an image to be projected onto the screen;

a light diffuser mounted in said housing adjacent said holder to receive light and transmit the received light to the transparency as diffused light;

a modeling light source in said housing for generating and transmitting modeling light to said diffuser; and a strobe light source in said housing for generating and transmitting a flash of light to said diffuser, said diffuser comprising a mirrored light passageway to receive light from said sources, a filter at the inlet of said light passageway to block rotation in the infrared portion of the light spectrum, and a ground glass plate at the outlet of said light passageway to direct diffused light to said holder.

2. A projector according to claim 1, comprising:

a reflector having a squared U-shape mounted in said housing, said modeling and strobe light sources each including a lamp mounted within the legs of the U.

3. A projector according to claim 1, wherein said holder comprises means for accurately aligning and positively positioning a transparency with respect to said light diffuser.

4. A projector according to claim 1, wherein sid filter comprises a dichroic plate.

5. A projector according to claim 1, comprising:

a first mirror mounted in said housing to direct light received along a first path from the transparency substantially perpendicular to the direction of said first path;

a second mirror mounted on the exterior of the housing to direct light received from said first mirror along a second path parallel to said first path; and diaphragm means mounted on said housing between said first and second mirrors for adjusting the light passing from said first mirror to said second mirror.

6. A projector according to claim 5, wherein said second mirror is permeable to light received in the opposite direction along said second path.

7. A projector according to claim 5, comprising:

adjustable mirror mounting means mounting said first mirror including means for varying the angle of said first mirror with respect to the direction of light received by said first mirror.

8. A projector for projecting an image onto a screen, comprising:

a housing;

a holder mounted in said housing for holding a transparency bearing an image to be projected onto the screen;

a light diffuser mounted in said housing adjacent said holder to receive light and transmit the treceived light to the transparency as diffused light;

a modeling light source in said housing for generating and transmitting modeling light to said diffuser;

a strobe light source in said housing for generating and transmitting a flash of light to said diffuser;

a first mirror mounted in said housing to direct light received along a first path from the transparency substantially perpendicular to the direction of said first path;

adjustable mirror mounting means mounting said first mirror, including means for varying the angle of said first mirror with respect to the direction of light received by said first mirror, said angle varying means comprising a disc secured to the rear surface of said first mirror and including a threaded bore therein, a first screw extending through said housing and engaging said threaded bore, and a plurality of second screws extending through said housing spaced about said first screw and abutting said disc;

a second mirror mounted on the exterior of the housing to direct light received from said first mirror along a second path parallel to said first path; and diaphragm means mounted on said housing for adjusting the light passing from said first mirror to said second mirror.

9. A projector for projecting an image on a screen, comprising:

a housing;

a transparency holder mounted in said housing for holding a transparency bearing an image to be projected on a screen;

light means in said housing for generating and transmitting light toward a transparency held in said holder; and a light diffuser mounted in said housing between said light means and said transparency holder, said light diffuser comprising a mirrored light passageway for receiving light from said light means, a filter at the inlet of said passageway for blocking radiation in the infrared portion of the light spectrum, and a ground glass plate at the outlet of said passageway to direct diffused light toward said holder.

* * * * *